United States Patent [19]

Wetzler et al.

[11] Patent Number: 4,681,261

[45] Date of Patent: Jul. 21, 1987

[54] HEAT RESISTANT SHORT NOZZLE

[75] Inventors: Dallas G. Wetzler; Ralph R. Conley, both of Florissant, Mo.

[73] Assignee: The United States of America as represented by the Secretary of the Air Force, Washington, D.C.

[21] Appl. No.: 782,629

[22] Filed: Oct. 1, 1985

[51] Int. Cl.$^4$ .................. B63H 11/10; B63H 11/00; D01H 9/10
[52] U.S. Cl. .......................... 239/265.19; 239/265.11; 60/271
[58] Field of Search .................. 239/265.11, 265.19; 60/271

[56] References Cited

U.S. PATENT DOCUMENTS

| 2,788,635 | 4/1957 | Ford, Jr. | 239/265.19 |
| 3,743,184 | 7/1973 | Mancus | 239/265.19 |
| 3,853,586 | 12/1974 | Olcott | 117/37 R |
| 3,896,615 | 7/1975 | Slatkin et al. | 60/204 |
| 3,940,067 | 2/1976 | Cherry et al. | 239/265.11 |
| 3,980,105 | 9/1976 | Myskowski | 138/140 |
| 4,063,684 | 12/1977 | O'Brien et al. | 239/265.11 |

Primary Examiner—Andres Kashnikov
Assistant Examiner—Patrick N. Burkhart
Attorney, Agent, or Firm—Bobby D. Scearce; Donald J. Singer

[57] ABSTRACT

An improved nozzle structure for an engine, such as a ramjet, rocket or turbojet, which generates thrust by expulsion of gaseous fuel combustion products along a thrust axis is described which comprises an annular wall structure defining an inlet and an outlet for the nozzle and having a contoured inner surface defining near the inlet a radially inwardly convergent annular ramp of predetermined length and convergence angle, near the outlet a radially outwardly divergent annular ramp of predetermined length and divergence angle, and a nozzle throat of predetermined diameter at the juncture of the annular ramps; a transverse web member disposed at the nozzle throat and extending diametrically of the annular wall, defining two substantially symmetrical passageways through the nozzle, having a leading edge near the inlet and trailing edge near the outlet, and having a double wedge shaped cross section symmetric with respect to a plane containing the thrust axis, the surface of the web member defining a pair of radially divergent ramps on the leading edge and extending from the inlet to the throat and a pair of radially convergent ramps from the throat to the trailing edge. The annular wall structure and web member comprise a heat resistant material such as a composite of carbon yarn within a carbon matrix, with some of the carbon fibers aligned along the length of the web, and a temperature resistant coating of pyrolytic graphite on both the annular wall structure and web.

5 Claims, 4 Drawing Figures 4,681,261

HEAT RESISTANT SHORT NOZZLE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to exhaust nozzle structures for engines providing thrust by expulsion of gaseous products of combustion of fuel, and more particularly to a novel heat resistant, dual flow passage, short nozzle structure for a ramjet, rocket or turbojet powered missile.

In thrust producing engines such as ramjets, rockets and turbojets, the propulsive nozzle cooperates with the combustor of the engine to convert thermal energy of the gaseous combustion products of fuel burned in the combustor and entering the nozzle to directed kinetic energy (thrust) at the nozzle exit by the expansion of the gases upon discharge. The gross thrust developed by the nozzle is directly related to the exhaust velocity of the expanding gases, and in order to maximize the propulsive efficiency of the engine, the expansion process in the nozzle must be accomplished as efficiently as possible. Additionally, the range of a missile powered by a thrust producing engine is primarily dependent upon the amount of fuel carried aboard the missile. Therefore, for a given missile length, minimizing engine length may maximize fuel capacity and range of the missile.

In existing engines having thrust producing propulsive exhaust nozzles, conventional axisymmetric convergent/divergent nozzles have found widespread use. This nozzle configuration normally exhibits efficient design point performance, acceptable weight, performance and cost attributes, and established and accurate design analysis technology; disadvantages of the conventional configuration include excessive nozzle length and inefficient off design performance. One annular nozzle configuration having an axisymmetric certerbody inserted near the throat of a conventional convergent/divergent nozzle and defining a substantially annular exhaust flow passage has been suggested to overcome the aforesaid disadvantages. Centerbody nozzle configurations may include the types disclosed by or referenced in U.S. Pat. No. 3,940,067.

Proposed solutions to overcome certain of the aforesaid disadvantages also include the replacement of a traditional axisymmetric conical nozzle with a multiple flow area nozzle. To obtain good propulsive efficiency, the flow passages of such nozzles are separated by relatively thin webs which are directly exposed to severe heating by combustion gases. A conventional fabrication approach for these webs has consisted of applying insulating material to a metal skeleton. With this approach, however, propulsive efficiency degrades during operation due to dimensional changes in the webs defining the multiple flow passages, and engine operating time is substantially limited by the exposure time of the webs at the temperature of the combustion gases.

The present invention provides an improved nozzle structure of large diameter to length ratio in a dual exhaust flow, substantially fixed geometry, convergent/divergent configuration. The nozzle is defined by a double wedge shaped web disposed transversely of the throat of a conical nozzle and which divides the region defined by the walls of the nozzle into two symmetrical flow passageways. The web and wall components of the nozzle comprise of a composite material including carbon yarn reinforcements within a carbon matrix. A coating of pyrolytic graphite deposited on the exposed surfaces of the web and walls retards oxidation by the exhaust gases.

It is, therefore, a principal object of the present invention to provide an improved exhaust nozzle structure for an engine providing propulsive thrust to a vehicle by expulsion of gaseous products of fuel combustion.

It is a further object of the invention to provide an exhaust nozzle structure which is characterized by minimum length.

These and other objects of the present invention will become apparent as the detailed description of certain representative embodiments thereof proceeds.

SUMMARY OF THE INVENTION

In accordance with the foregoing principles and objects of the present invention, an improved nozzle structure for an engine, such as a ramjet, rocket or turbojet, which generates thrust by expulsion of gaseous fuel combustion products along a thrust axis is described which comprises an annular wall structure defining an inlet and an outlet for the nozzle and having a contoured inner surface defining near the inlet a radially inwardly convergent annular ramp of predetermined length and convergence angle, near the outlet a radially outwardly divergent annular ramp of predetermined length and divergence angle, and a nozzle throat of predetermined diameter at the juncture of the annular ramps; a transverse web member disposed at the nozzle throat and extending diametrically of the annular wall, defining two substantially symmetrical passageways through the nozzle, having a leading edge near the inlet and trailing edge near the outlet, and having a double wedge shaped cross section symmetric with respect to a plane containing the thrust axis, the surface of the web member defining a pair of radially divergent ramps on the leading edge and extending from the inlet to the throat and a pair of radially convergent ramps from the throat to the trailing edge. The annular wall structure and web member comprise a heat resistant material such as a composite of carbon yarn within a carbon matrix, with some of the carbon fibers aligned along the length of the web, and a temperature resistant coating of pyrolytic graphite on both the annular wall structure and web. The nozzle of the invention has short overall length compared to conventional axisymmetric convergent/divergent nozzles of substantially the same discharge to throat area ratio and discharge angle.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
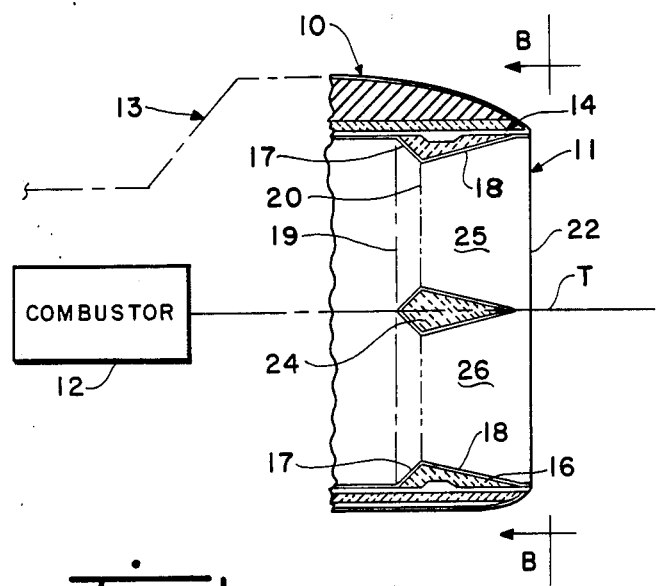
FIG. 1 is a view in axial section of the aft portion of a vehicle illustrating the exhaust region of the engine thereof including the nozzle of the present invention.
Figure 2:
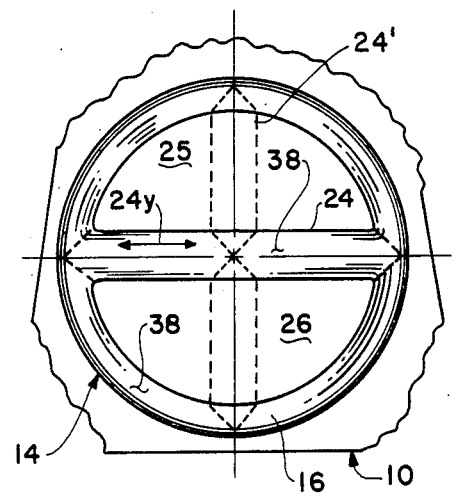
FIG. 2 is a view taken along line B—B of FIG. 1.

Referring now to FIGS. 1 and 2, shown in FIG. 1 is a view in axial section of the aft portion of a vehicle 10, such as a missile or the like, including the thrust/exhaust region 11 and combustor 12 of engine 13, comprising a ramjet, rocket or like engine which powers vehicle 10 by producing thrust along a longitudinal axis T. Region 11 is defined in part by an exhaust nozzle 14 comprising the present invention. FIG. 2 is an aft view of vehicle 10 taken along line B—B of FIG. 1.

Nozzle 14 of the present invention comprises an annular portion 16 having contoured inner walls defining a radially inwardly convergent first annular ramp 17 which is the convergent portion of nozzle 14, and a radially outwardly divergent second annular ramp 18 which is the divergent portion of nozzle 14. Annular ramp 17 defines an inlet for nozzle 14 and the compression region of exhaust 11, and extends axially from the inlet at combustor/nozzle interface plane 19 to throat 20. Annular ramp 18 defines the expansion region of exhaust 11 and extends axially from throat 20 to nozzle outlet or discharge plane 22. A web member 24 having a symmetrical double wedge shaped cross section, substantially as shown in FIG. 1, is integrally formed with and disposed along a diameter of annular portion 16, substantially as shown in FIG. 2. Web 24 divides exhaust region 11 into two flow passages 25,26 which are substantially symmetrical with respect to a plane along axis T through web 24.

Minimizing the length of nozzle 14 (i.e., axial distance between combustor/nozzle interface plane 19 and nozzle discharge plane 22), while maintaining desirable nozzle operating characteristics, maximizes space available for fuel in vehicle 10 of given length. However, in the efficient operation of a nozzle, a critical consideration is the ratio of the cross-sectional area of the nozzle discharge to the cross-sectional area of the throat. For nozzle 14 of FIGS. 1 and 2 such a ratio may be defined as $A_D/A_T$ where $A_D$ is the cross-sectional area of nozzle 14 (in a plane perpendicular to axis T) at discharge 22, and $A_T$ is the cross-sectional area of throat 20.

In certain applications it may be desirable (such as to increase $A_D/A_T$) to add a second web 24', of identical cross section as web 24, diametrically of annular portion 16 and perpendicular to web 24 and integral therewith, as shown in phantom in FIG. 2. Four substantially identical flow passages are thereby defined.

Normally the efficiency of a nozzle decreases with length since shortening overall length, for the same discharge and throat cross-sectional areas, necessarily increases the divergence angle of the nozzle wall in the expansion region of the nozzle. The divergence angle for nozzle 14 as shown in FIGS. 1–4 is that angle d defined between axis T and second annular ramp 18 extended to intersect axis T, which angle defines one half the solid angle D through which combustion gases are exhausted from nozzle 14 in generating thrust. Placement of web 24 at throat 20 and diametrically of annular portion 16 as suggested by FIGS. 1 and 2 redefines the discharge area to throat ratio (by reducing throat cross-sectional area) and allows shortening of the nozzle from throat to discharge without changing exhaust flow angle and discharge area, and without substantially impairing nozzle efficiency.

Figure 3:
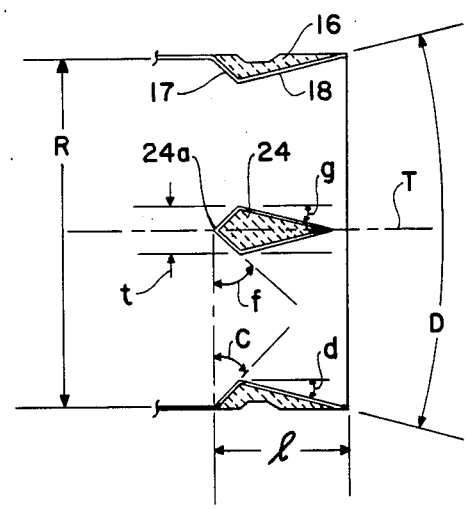
FIG. 3 is view in axial section of the annulus and web of the nozzle of FIG. 1 illustrating the structural parameters important in the fabrication and operation thereof.

Referring now to FIG. 3, shown therein is a view in axial section of annular portion 16 and web 24 of FIG. 1 illustrating structural parameters important in the fabrication and operation of nozzle 14. In conventional nozzle structures, the discharge to throat area ratio range depends upon engine type and may typically be in the range of about 1.1 to 2 for turbojets, about 1.5 to 8 for ramjets, and about 8 to 20 for rockets for discharge angles D of from about 20° to about 40°. In nozzle 14 of the present invention best applicable as depicted in the Figures for ramjet nozzle structures, the ratio $A_D/A_T$ is maintained in substantially the corresponding range by reason of web 24 disposed diametrically. Solid angle D subtending discharge plane 22 is thus maintained in the corresponding range with an axial distance between throat 20 and discharge 22 foreshortened as compared to conventional nozzles. Specifically, in a unit built and tested in demonstration of the present invention, divergent annular ramp 18 defined an angle d of 13° which corresponds to a discharge angle D of 26°. Angle C of convergent ramp 17 of the demonstration unit was arbitrarily selected to be 45°. Angle f of the upstream leading edge of web 24 was selected to match convergent angle C for ramp 17, which results in a web 24 structure having maximum predetermined thickness t at a point coincident with the plane of throat 20 and a leading edge 24a in combustor/nozzle interface plane 19; angle g of the downstream trailing edge of web 24 may preferably be selected so that web 24 terminates at or just upstream of discharge plane 22. In the demonstration nozzle 14 constructed in accordance with the foregoing for a combustor 12 diameter R of 5.000 inches, throat 20 diameter of 4.326 inches, discharge 22 diameter of 5.050 inches, a discharge angle D of 26°, and web 24 having a maximum thickness t of 0.674 inches, nozzle length 1 could be maintained at 2.125 inches, whereas a conventional nozzle without web 24 and otherwise identically dimensioned had a length of 3.34 inches for substantially the same (within 0.5%) nozzle propulsive efficiency. The nozzle of the present invention therefore may be approximately 40% shorter than conventional nozzles.

Figure 4:
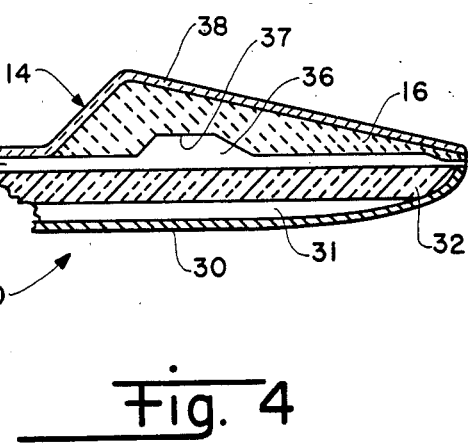
FIG. 4 is a detailed sectional view of the annular portion of the nozzle of FIG. 1.

Referring now to FIG. 4, shown therein is a schematic view in axial section of a representative structure for integrating nozzle 14 into a combustor, together with associated supporting structure of vehicle 10. Typical aft structure for vehicle 10 may include outer skin 30 and insulation layer 32 separated by an air gap 31. Structural shell 34 of combustor 12 comprises a high temperature resistant material such as carbon-carbon composite material. Annular portion 16 of nozzle 14 may be supported within vehicle 10 by annular retention ridge 36 formed in combustor shell 34 for engaging a mating annular groove 37 in annular portion 16. A pyrolytic graphite coating 38 may be applied to the inner surface of both combustor shell 34 and nozzle 14 for oxidation protection.

In the demonstration unit, web 24 and annular portion 16 were formed and machined as an integral unit from a billet of composite material comprising carbon yarn reinforcements within a carbon matrix. A portion of the yarn reinforcements were aligned along the length of web 24 (as suggested by arrow 24y on FIG. 2) to maximize strength of the integral unit. In the fabrication of the unit, the carbon yarns comprising combustor shell 34 and ridge 36 may be woven around nozzle 14 as combustor 12 is fabricated. The carbon yarns are then processed to carbon-carbon composite. Pyrolytic graphite 38 may then be chemical vapor deposited on the surfaces of nozzle 14 and combustor shell 34 defining flow passages 25,26 to provide high temperature oxidation resistance of the internal wall surfaces. To enhance adhesion of the pyrolytic graphite coating to the leading and trailing edges of web 24 and to the intersections of web 24 and annular portion 16, specific blend radii were machined at these locations prior to coating. Other high temperature resistant materials may be used to produce nozzle 14 as would occur to one with skill in the field of the invention, and may include graphite, silica phenolic, aluminum nitride, silicon nitride, or the like, formed or machined conventionally to the shape prescribed herein. Other oxidation resistant compounds such as the carbides and diborides of hafinium, zirconium and silicon may be applied as coatings or diffused into the matrix comprising the nozzle structure. Therefore, the specific representative example described above is not exhaustive of the material selections within the scope of these teachings.

The present invention therefore provides a novel dual flow passage exhaust nozzle structure for an engine providing propulsive thrust to a vehicle by the expulsion of gaseous fuel combustion products. The preferred materials of construction as described provide dimensional stability for the nozzle and extend engine life as compared to insulated metallic nozzle structures of the prior art.

It is understood that modifications to the invention may be made as might occur to one with skill in the field of the invention, within the scope of the appended claims. Accordingly, all embodiments contemplated hereunder which achieve the objects of the invention have not been shown in complete detail. Other embodiments may be developed without departing from the spirit of the invention or from the scope of the appended claims.

We claim:

1. An exhaust nozzle for an engine which generates thrust by expulsion of gaseous products of fuel combustion, comprising:
    (a) a substantially annular wall structure defining an inlet and an outlet and a compression region near said inlet and an expansion region near said outlet for passage of said gaseous products along a central thrust axis defined through said nozzle from said inlet to said outlet;
    (b) said annular wall structure having a contoured annular inner surface between an inlet plane defined at said inlet and an outlet plane defined at said outlet, said surface defining within said compression region near said inlet plane a first radially inwardly convergent annular ramp of first preselected length and first preselected angle of convergence relative to said axis, and within said expansion region near said outlet plane a second radially outwardly divergent annular ramp of second preselected length and second preselected angle of divergence relative to said axis, said first preselected length and angle differing respectively from said second preselected length and angle, said first and second ramps joining along said contour between said inlet plane and said outlet plane to define a nozzle throat of preselected inside diameter separating said compression region from said expansion region;
    (c) a transverse web member disposed at said nozzle throat and extending diametrically of said annular wall structure and defining two substantially symmetrical passageways extending through said nozzle between said inlet and outlet planes, said web member having a leading edge intersecting said axis and lying substantially in and diametrically of said inlet plane and a trailing edge intersecting said axis and lying substantially in and diametrically of said outlet plane, said web member further having a double wedge shaped cross section symmetric with respect to a plane containing said axis and having maximum thickness at said nozzle throat, the surface of said web member defining a first pair of radially divergent ramps along said leading edge and extending from said inlet plane to said nozzle throat and a second pair of radially convergent ramps along said trailing edge and extending from said nozzle throat to said outlet plane.

2. The exhaust nozzle as recited in claim 1 wherein said contoured annular surface of said annular wall structure and said web member comprise a heat resistant composite of carbon yarn fibers within a carbon matrix.

3. The exhaust nozzle as recited in claim 2 wherein a portion of said carbon yarn fibers within said web member are aligned substantially along the length of said transverse web member diametrically of said annular wall structure.

4. The exhaust nozzle as recited in claim 2 further comprising a heat resistant coating of pyrolytic graphite on said contoured annular surface of said annular wall structure and on said transverse web member.

5. The exhaust nozzle as recited in claim 1 wherein the ratio of the cross-sectional area of said outlet at said outlet plane to the total cross-sectional area of said two passageways at said nozzle throat is from about 1.5 to about 8.

* * * * *